United States Patent
Li et al.

(10) Patent No.: US 9,009,367 B2
(45) Date of Patent: Apr. 14, 2015

(54) ADAPTIVE INTERRUPT MODERATION

(75) Inventors: Yadong Li, Portland, OR (US); Linden Cornett, Portland, OR (US); Manasi Deval, Beaverton, OR (US); Anil Vasudevan, Portland, OR (US); Parthasarathy Sarangam, Portland, OR (US)

(73) Assignee: Intel Corporation, Santa Clara, CA (US)

(*) Notice: Subject to any disclaimer, the term of this patent is extended or adjusted under 35 U.S.C. 154(b) by 138 days.

(21) Appl. No.: 13/566,298

(22) Filed: Aug. 3, 2012

(65) Prior Publication Data

US 2014/0040514 A1 Feb. 6, 2014

(51) Int. Cl.
*G06F 3/00* (2006.01)
*G06F 15/16* (2006.01)
*G06F 13/24* (2006.01)

(52) U.S. Cl.
CPC ................................. *G06F 13/24* (2013.01)

(58) Field of Classification Search
CPC ............................. G06F 13/24; G06F 11/1687
See application file for complete search history.

(56) References Cited

U.S. PATENT DOCUMENTS

| | | | |
|---|---|---|---|
| 2005/0172029 A1* | 8/2005 | Burke et al. | 709/232 |
| 2010/0274938 A1* | 10/2010 | Anand et al. | 710/263 |
| 2011/0126203 A1* | 5/2011 | Fahrig | 718/102 |
| 2012/0254492 A1* | 10/2012 | Li et al. | 710/269 |
| 2013/0097437 A9* | 4/2013 | Naveh et al. | 713/320 |

OTHER PUBLICATIONS

IEEE 802.3 Section One—Clause 1 through Clause 20 and Annex H and Annex 4A, 2008 IEEE, 671 pages.
IEEE 802.3 Section Two—Clause 21 through Clause 33 and Annex 22A through Annex 33E, 2008 IEEE, 790 pages.
IEEE 803.2 Section Three—Clause 34 through Clause 43 and Annex 36A through Annex 43C, 2008 IEEE, 315 pages.
IEEE 802.3 Section Four—Clause 44 through Clause 55 and Annex 44A through Annex 55B, 2008 IEEE, 586 pages.
IEEE 802.3 Section Five—Clause 56 through Clause 74 and Annex 57A through Annex 74A, 2008 IEEE, 615 pages.
ATM-MPLS Network Interworking Version 1.0, The ATM Forum Technical Committee, Aug. 2001, 12 pages.

* cited by examiner

*Primary Examiner* — Hyun Nam
(74) *Attorney, Agent, or Firm* — Grossman, Tucker, Perreault & Pfleger, PLLC

(57) ABSTRACT

Generally, this disclosure relates to adaptive interrupt moderation. A method may include determining, by a host device, a number of connections between the host device and one or more link partners based, at least in part, on a connection identifier associated with each connection; determining, by the host device, a new interrupt rate based at least in part on a number of connections; updating, by the host device, an interrupt moderation timer with a value related to the new interrupt rate; and configuring the interrupt moderation timer to allow interrupts to occur at the new interrupt rate.

20 Claims, 2 Drawing Sheets

ADAPTIVE INTERRUPT MODERATION

FIELD

The present disclosure relates to interrupt moderation, and, more particularly, to adaptive interrupt moderation.

BACKGROUND

Interrupt context switching and the associated processing overhead can be a performance problem for high speed I/O (input/output) devices. As processor technology advances, the number of cores and/or processors in computing devices is increasing. Applications such as web servers demand an increasing number of I/O queues (i.e., transmit/receive queues) from a network controller to match the number of cores in the system. Existing interrupt moderation schemes for multiple I/O queues, with an associated interrupt vector for each queue, may favor one application over other applications resulting in degradation in performance for the other applications.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
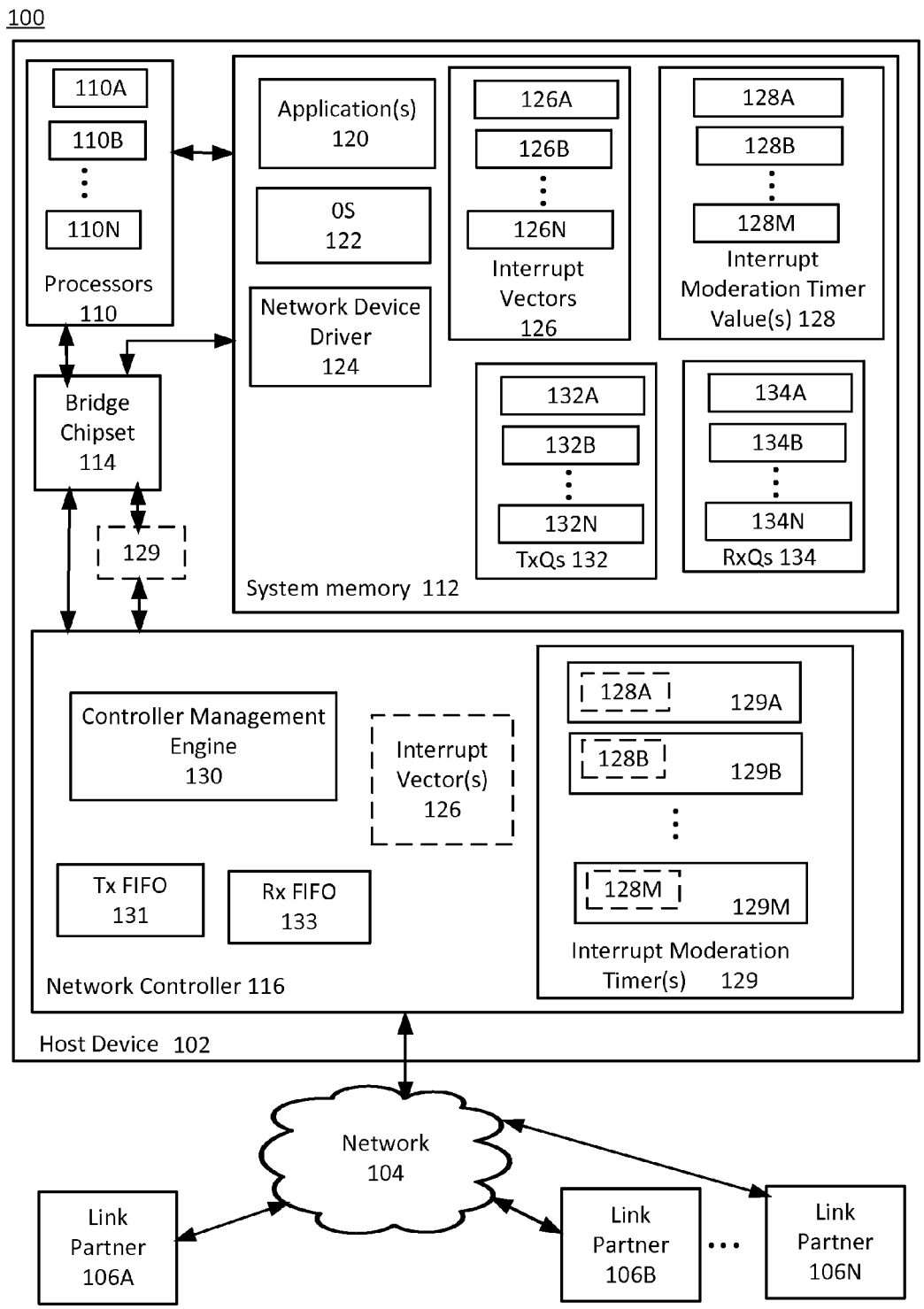
FIG. 1 illustrates one exemplary system embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Determination of an appropriate interrupt moderation timer (and thereby interrupt rate) based on the number of packets or number of bytes received in a interrupt window may favor latency-sensitive applications while degrading performance of, e.g., web servers, because of the relatively high interrupt rate. For example, Hadoop™ clusters (i.e., clusters of computers configured for distributed processing of relatively large data sets using the Apache™ Hadoop™ framework) typically use a single connection for data access and/or replication, and require a very high interrupt rate to achieve maximum throughput. In another example, a High Performance Computing (HPC) cluster (i.e., a cluster of servers networked together where each server in the cluster performs one or more specific tasks, e.g., supercomputer) typically use relatively few connections but require a very high interrupt rate to reduce latency. In contrast, a web server, for example, may have thousands of connections but may require a relatively low interrupt rate for maximum efficiency.

Generally, this disclosure relates to adaptive interrupt moderation. A method and system are configured to determine a new interrupt rate based, at least in part, on a number of connections and to update an interrupt moderation timer with a value related to the new interrupt rate. A connection (i.e., packet flow) as used herein corresponds to a source-destination identifier pair. The source identifier is related to a source endpoint and the destination identifier is related to a destination endpoint in a network system configured to transport packets that may include messages and/or data between the source endpoint and the destination endpoint. A connection may include, but is not limited to, a TCP (Transmission Control Protocol) connection and a UDP (User Datagram Protocol) data stream. Connection may further include other and/or later-defined transport protocols. A source identifier includes a source port number and may include a source IP address. A destination identifier includes a destination port number and may include a destination IP (Internet Protocol) address. A connection may be identified based, at least in part, on a source identifier and a destination identifier. The source-destination identifier pair is typically included in a packet header.

The number of connections may be determined based, at least in part, on one or more connection identifier(s). A new interrupt rate may then be determined based, at least in part, on the number of connections. If the number of connections is between a high threshold and a low threshold, a number of packets, a number of bytes and an average packet size (i.e., number of bytes per packet) may be determined. The new interrupt rate may then be adjusted based, at least in part, on the number of packets and/or the average packet size. The interrupt moderation timer may then be updated with a value related to the new interrupt rate. Updating the interrupt moderation timer with the value may then configure the interrupt moderation timer to allow interrupts to occur at the new interrupt rate. Thus, interrupt moderation may be based, at least in part, on the number of connections. For example, a network device driver included in a host device may be configured to perform the operations associated with adaptive interrupt moderation.

Thus, for a relatively low number of connections, the relatively high interrupt rate is configured to maximize throughput and reduce latency. For a relatively high number of connections, the relatively low interrupt rate is configured to maximize efficiency. For an intermediate number of connections, the interrupt rate may be selected based, at least in part, on the number of packets and/or average packet size, configured to reduce latency and increase efficiency.

A connection identifier may be determined based, at least in part, on a source identifier and a destination identifier included in each packet. Each source and destination identifier pair may be used to identify a respective connection. For example, a network controller configured for Receive Side Scaling (RSS) is configured to generate a hash value of a 4-tuple that includes a source IP address, source port number, destination IP address and destination port number in a packet header of a received packet. The hash value may be used to identify the connection (i.e., packet flow) associated with the received packet. In another example, the 4-tuple may be used to identify the connection. In another example, a 2-tuple is used that includes the source port number and the destination port number) may be used to identify the connection. The connection identifiers may be included in, e.g., receive descriptors associated with receive queues. The number of connections may then be determined by counting the number of unique connection identifiers. Efficiency may be improved in systems that include a network controller capable of determining (e.g., generating) a connection identifier as the network device driver may avoid parsing headers to identify a connection.

FIG. 1 illustrates one exemplary system embodiment consistent with the present disclosure. System 100 generally includes a host device 102, a network 104 and a plurality of link partners 106A, 106B, ..., 106N. For example, the host device 102 may be configured to transmit messages and/or data via network 104 to link partners 106A, 106B, ..., 106N. The host device 102 may be further configured to receive messages and/or data from link partners 106A, 106B, ..., 106N via network 104.

The host device 102 generally includes a plurality of processors and/or processor cores, processors 110 (individually 110A, ..., 110N), a system memory 112, a bridge chipset 114, and a network controller 116. The processors 110 are coupled to the system memory 112 and the bridge chipset 114. In some embodiments, the bridge chipset may be included in processors 110. The bridge chipset 114 is coupled to the system memory 112 and the network controller 116. The network controller 116 is configured to provide the host device 102 with network connectivity.

The system memory 112 is configured to store one or more application(s) 120, an operating system OS 122, a network device driver 124, one or more interrupt vector(s) 126 (individually 126A, ..., 126N) and one or more interrupt moderation timer value(s) 128 (individually 128A, ..., 128M). Each interrupt moderation timer value is configured to set an interrupt interval and thereby a corresponding interrupt rate for an interrupt moderation timer. The application(s) 120 may be configured to send data to, and to receive data from, one or more of the link partner(s) 106A, 106B, ..., 106N via network 104. The memory 112 is further configured to store a plurality of transmit queues TxQs 132 (individually 132A, ..., 132N) and a plurality of receive queues RxQs 134 (individually 134A, ..., 134N). In some embodiments, a number of IO queues (TxQs 132 and RxQs 134) may correspond to a number of processors 110. Each queue pair (TxQ 132A, ..., 132N and RxQ 134A, ..., 134N) may be associated with a respective interrupt vector 126A, ..., 126N.

Operating system 122 and/or network controller 116 may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network, e.g., network 104. A protocol stack may alternatively be comprised on a dedicated sub-system such as, for example, a TCP offload engine and/or network controller 116.

The network controller 116 may include a controller management engine 130 and one or more interrupt moderation timer(s) 129 (individually 129A, ..., 129M). In some embodiments, the interrupt moderation timer(s) 129 may be included elsewhere in host device 102. Each interrupt moderation timer 129A, ..., 129M is configured to store a respective interrupt moderation timer value 128A, ..., 128M. Each interrupt moderation timer value 128A, ..., 128M is configured to set an associated interrupt moderation interval for a respective interrupt moderation timer 129A, ..., 129M. In some embodiments, the network controller 116 may be configured to store the interrupt vector(s) 126. One or more of the interrupt moderation timers 129A, ..., 129M may be associated with each interrupt vector 126A, ..., 126N. The network controller 116 may be configured to store one or more transmit buffers Tx FIFO 131 and one or more receive buffers Rx FIFO 133. The transmit buffer(s) Tx FIFO 131 are configured to store packets prior to transmission and the receive buffer(s) Rx FIFO 133 are configured to store received packets.

The controller management engine 130 is configured to manage communication between host device 102 and a link partner, e.g., link partner 106A. The controller management engine 130 may be further configured to generate an interrupt in response to one or more events. For example, the controller management engine 130 may be configured to generate an interrupt when an interrupt moderation timer 129A, ..., 129M expires (e.g., times out). The network device driver 124 may be configured to process packets received and/or communicate with application(s) 120 based on the interrupt.

Interrupt moderation timer(s) 129 and their associated interrupt moderation timer value(s) 128 are configured to reduce an interrupt rate so that the processors 110 are not interrupted whenever a packet is received or in response to a packet being sent. Interrupt moderation is configured to permit interrupts based, at least in part, on time intervals to increase the likelihood that a plurality of packets may be processed in response to the interrupt. The network controller 116 is configured to provide an interrupt to a processor 110A, ..., 110N when an associated interrupt moderation timer 129A, ..., 129M expires rather than every time a packet is received or in response to a packet being sent. The rate at which the network controller 116 provides an interrupt to a processor 110A, ..., 110N is related to the interrupt moderation value stored by the interrupt moderation timer.

The network device driver 124 is configured to process packets sent to the TxQs 132 and packets received from the RxQs 134. Based, at least in part, on the packet processing, the network device driver 124 is configured to update associated interrupt moderation timer(s) 128. The network controller 116 is then configured to generate an interrupt in response to expiration of an associated interrupt moderation timer. Thus, the interrupt rate may be limited based on the interrupt moderation timer. The interrupt moderation rate may be determined based, at least in part, on a number of connections. The network device driver 124 is configured to determine the number of connections (e.g., TCP connections and/or UDP data streams). The number of connections and/or data streams may be determined based at least in part on packet processing data.

For example, packet flow (i.e., connection) identifiers associated with packets to be transmitted may be included in a Tx descriptor stored in TxQs 132. The transmit connection identifiers may be stored in Tx descriptor when the associated packets are stored in, e.g., the transmit queue TxQ 132A. Packet flow (i.e., connection) identifiers associated with receive packets may be included in a Rx descriptor stored in RxQs 134. Such receive flow identifiers may be stored in RxQs 134 when receive packets are retrieved from Rx FIFO 133 for processing. In an embodiment, controller management engine 130 may be configured to determine a packet flow receive identifier and to store packet flow receive identifiers in receive descriptors included in RxQs 134. The network device driver 124 may then be configured to determine a number of unique packet flow identifiers included in TxQs 132 and RxQs 134.

For example, for a network controller 116 (and controller management engine 130) configured for receive side scaling (RSS), the network controller 116 may be configured to determine connection identifier based, at least in part, on a hash value. A network controller configured for RSS may determine a hash value based on a TCP 4-tuple (source IP, destination IP, source port, destination port) of a received packet. The hash value may be generated using a Toeplitz technique. Each hash value corresponds to a connection identifier and may be stored in a Rx descriptor in RxQs 134. Thus, the number of unique hash values may correspond to the number of connections. The network device driver 124 may then determine the number of connections based on the number of unique hash values.

In another example, the connection identifiers may be determined based on the 4-tuple (source IP, destination IP, source port, destination port). The 4-tuple may uniquely identify a connection. The network controller 116 (e.g., controller management engine 130) may be configured to store each 4-tuple in an Rx descriptor (associated with the received packets from the identified connection) in RxQs 134. The network device driver 124 may then count the number of unique 4-tuples to determine the number of connections.

In another example, a subset of the 4-tuple, e.g., source and destination port numbers of a received packet, may be used to identify a connection. The network controller 116 may be configured to store a subset of each 4-tuple in an Rx descriptor (associated with the received packets from the identified connection) in RxQs 134. The network device driver 124 may then determine the number of connections based on the port information included in the Rx descriptor stored in the RxQs 134. The network device driver 124 may thus determine a number of connections (i.e., packet flows) while avoiding additional overhead associated with parsing the packet. Based at least in part on the number of connections, the network device driver 124 may select an interrupt moderation rate.

The network device driver 124 may be configured to determine the number of connections in response to an interrupt. During the interrupt interval (i.e., interrupt window) prior to the interrupt, network controller 116 and controller management engine 130 may update the RxQs 134 with received packets and associated Rx descriptors. The network device driver 124 may then determine the number of connections based, at least in part, on the Rx descriptors. In an embodiment, the number of connections may be approximated based, at least in part, on receive connection identifiers.

The network device driver 124 may be configured to perform additional operations in order to adaptively select an interrupt moderation timer. The additional operations may include determining a number of packets, a number of bytes and an average packet size. Whether an average packet size is determined may be based, at least in part, on the number of connections, as described herein. The average packet size corresponds to the number of bytes divided by the number of packets.

For example, the number of transmit packets may correspond to a count of packets provided to TxQs 132 by, e.g., network device driver 124. The number of receive packets may correspond to a count of packets stored in RxQs 134. Whether the number of receive packets is determined by network device driver 124 or controller management engine 130 may depend on the capabilities of network controller 116. The average size of the receive packets may be determined based on a number of bytes in each packet payload for each packet stored in RxQs 134. For example, the number of bytes in each packet payload may be summed to determine the total number of bytes. In response to an interrupt, and if the number of connections is between a low threshold and a high threshold, the average packet size may be determined by dividing the sum of the number of bytes by the count of packets. Similarly, the average size of the transmit packets may be determined based on a number of bytes in each packet payload for each packet stored in TxQs 132.

Table 1 includes one example pseudocode configured to determine a new interrupt rate based, at least in part, on a number of connections, consistent with the present disclosure. The low thresholds and high thresholds in the pseudocode are generally configurable, e.g., user-selectable. For example, NumConnections low threshold may be in the range of four to sixteen, NumConnections high threshold may be greater than or equal to thirty two, the NumPackets high threshold may be greater than or equal to thirty two and the AvePacketSize low threshold may be in the range of 512 to 1024 bytes. Such ranges are provided merely as examples for illustrative purposes. Other values may be selected within the scope of the present disclosure.

TABLE 1

Determine new interrupt rate (NewIntRate)
    If (NumConnections < NumConnections low threshold)
        NewIntRate = high interrupt rate (e.g., 20,000 interrupts/sec)
    Else If (NumConnections > NumConnections high threshold)
        NewIntRate = low interrupt rate (e.g., 6,000 interrupts/sec)
    Else
        NewIntRate = medium interrupt rate (6,000 - 12,000
        interrupts/sec)
    If (NewIntRate == medium interrupt rate)
        If (NumPackets > NumPackets high threshold &&
            AvePacketSize > AvePacketSize low threshold)
                NewIntRate = 6,000 interrupts/sec
        Else if (AvePacketSize < AvePacketSize low threshold)
            NewIntRate = 12,000 interrupts/sec
        Else
            NewIntRate = 8,000 interrupts/sec In an embodiment, if the number of connections is relatively small or if the number of connections is relatively large, then the interrupt moderation rate may be determined (e.g., selected) based on the number of connections. For example, if the number of connections is less than a low threshold, the interrupt rate selected may be relatively high, e.g., 20,000 interrupts/second. Continuing with this example, if the number of connections is greater than a high threshold, the interrupt rate selected may be relatively low, e.g., 6,000 interrupts per second. Thus, in this example, the interrupt rate may be determined based on the number of connections. In another example, if the number of connections is between the low threshold and the high threshold, the interrupt moderation rate may be further based on the number of packets and/or the average packet size. Continuing with this example, if the number of packets is greater than a number of packets high threshold and the average packet size is greater than a packet size low threshold, then the new interrupt rate may be relatively low, e.g., 6,000 interrupts per second. If the average packet size is less than the packet size low threshold, then the new interrupt rate may be intermediate, e.g., 12,000 interrupts/sec. If the number of packets is less than a number of packets high threshold and the average packet size is greater than a packet size low threshold, then the new interrupt rate may be between the low rate and the intermediate rate, e.g., 8,000 interrupts per second.

The interrupt moderation timer may then be updated with a value related to the new interrupt rate (NewIntRate). The network controller may then be configured to generate interrupts when an interrupt moderation timer expires and the actual interrupt rate may then correspond to the new interrupt rate (NewIntRate). The thresholds for number of connections, number of packets and/or packet size and the resulting interrupt rates may be configurable. The values shown are meant to be illustrative and not limiting.

Thus, an interrupt moderation rate may be updated based, at least in part, on a number of connections. Depending on the number of connections, the interrupt moderation rate may be adjusted based, at least in part, on the number of packets and/or the average packet size. The interrupt moderation rate may be updated at each interrupt interval based, at least in part, on the number of connections determined in a prior interrupt interval. Thus, not only may the interrupt rate be updated based, at least in part, on a number of connections, but also the updating may be performed as frequently as each interrupt interval.

Figure 2:
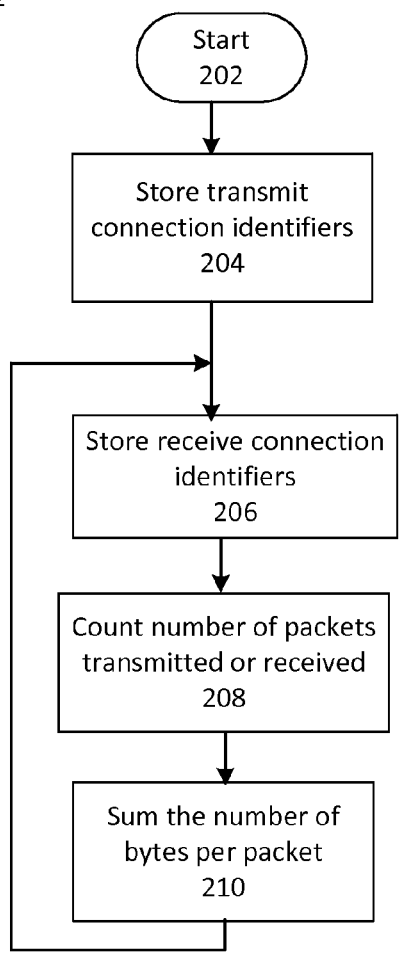
FIG. 2 is a flowchart illustrating example operations of an adaptive interrupt moderation system consistent with the present disclosure.

FIG. 2 is a flowchart 200 illustrating example operations of an adaptive interrupt moderation system consistent with the present disclosure. The operations may be performed, for example, by a network device driver and/or a network controller. In particular, flowchart 200 depicts exemplary operations configured to store data for determining a number of connections, a number of packets, number of bytes and/or an average packet size. The operations of flowchart 200 may begin at operation 202, initiated in response to updating an interrupt moderation timer.

Operation 204 may include storing transmit connection identifiers. For example, the transmit connection identifiers may correspond to a Tx descriptor stored in a transmit queue. Operation 206 may include storing receive connection identifiers. For example, the receive connection identifiers may correspond to a Rx descriptor stored in a receive queue. Counts of numbers of transmit and receive packets may be incremented at operation 208. For example, the count of transmit packets may be incremented in response to transmit packets being provided to a transmit queue and the count of received packets may be incremented in response to packets being provided to a receive queue. Operation 210 may include summing of a number of bytes per packet. For example, a first sum may correspond to bytes included in the payloads of receive packets stored in a receive queue and a second sum may correspond to bytes included in the payloads of transmit packets stored in a transmit queue. Program flow may then return to operation 204.

Figure 3:
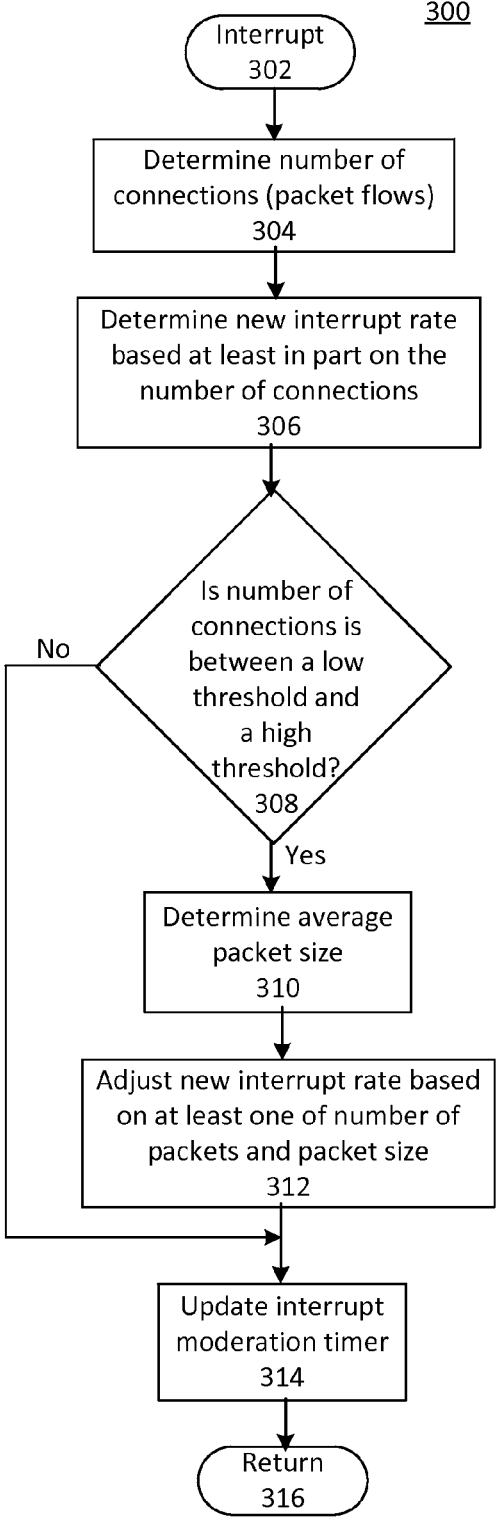
FIG. 3 is a flowchart illustrating example operations for determining a new interrupt rate based, at least in part, on a number of connections consistent with an embodiment of the present disclosure.

FIG. 3 is a flowchart 300 illustrating example operations for determining a new interrupt rate based, at least in part, on a number of connections consistent with an embodiment of the present disclosure. The operations may be performed, for example, by a network device driver. In particular, flowchart 300 depicts exemplary operations configured to determine a new interrupt rate based, at least in part, on a number of connections. Program flow may begin with an interrupt at operation 302. The number of connections (i.e., packet flows) may be determined at operation 304. Operation 306 may include determining a new interrupt rate based, at least in part on the number of connections.

Whether the number of connections is between a low threshold and a high threshold may be determined at operation 308. If the number of connections is not between the low threshold and the high threshold, program flow may proceed to operation 314. If the number of connections is between the low threshold and the high threshold, operation 310 may include determining an average packet size. For example, the average packet size may be determined based, at least in part, on the number of packets and number of bytes determined during an interrupt interval (e.g., operations 208 and 210 of FIG. 2). The new interrupt rate determined at operation 306 may be adjusted based on at least one of number of packets and packet size at operation 312. The interrupt moderation timer may be updated at operation 314. For example, an interrupt moderation timer value related to the new interrupt rate may be stored in an interrupt moderation timer. Program flow may then return 316.

While FIGS. 2 and 3 illustrate various operations according to an embodiment, it is to be understood that not all of the operations depicted in FIGS. 2 and 3 are necessary for other embodiments. Indeed, it is fully contemplated herein that in other embodiments of the present disclosure, the operations depicted in FIGS. 2 and 3 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

While the foregoing is prided as exemplary system architectures and methodologies, modifications to the present disclosure are possible. For example, an operating system 122 in host system memory may manage system resources and control tasks that are run on, e.g., host device 102. For example, OS 122 may be implemented using Microsoft Windows, HP-UX, Linux, or UNIX, although other operating systems may be used. In one embodiment, OS 122 shown in FIG. 1 may be replaced by a virtual machine manager which may provide a layer of abstraction for underlying hardware to various operating systems running on one or more processing units.

Other modifications are possible. For example, system memory, e.g., system memory 112 and/or memory associated with the network controller, e.g., network controller 116, may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory 112 and/or memory associated with network controller 116 may comprise other and/or later-developed types of computer-readable memory.

Network 104 may comprise a packet switched network. Network controller 116 may be capable of communicating with link partner(s) 106A, . . . , 106N using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternatively or additionally, network controller 116 may be capable of communicating with link partner(s) 106A, . . . , 106N, using an X.25 communications protocol. The X.25 communications protocol may comply or be compatible with a standard promulgated by the International Telecommunication Union-Telecommunication Standardization Sector (ITU-T). Alternatively or additionally, network controller 116 may be capable of communicating with link partner(s) 106A, . . . , 106N, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network controller 116 may be capable of communicating with link partner(s) 106A, . . . , 106N, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

As used in any embodiment herein, the term "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU and/or other programmable circuitry. Also, it is intended that operations described herein may be distributed across a plurality of physical devices, such as processing structures at more than one different physical locations. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

A method and system are configured to update an interrupt moderation timer based, at least in part, on a number of connections. The number of connections may be determined and a new interrupt moderation rate may be determined based, at least in part, on the number of connections. If the number of connections is between a high threshold and a low threshold, an average packet size (i.e., number of bytes per packet) may be determined. The new interrupt moderation rate may then be adjusted based on at least one of the number of packets and the average packet size. The interrupt moderation timer may then be updated with a value related to the new interrupt rate. Thus, interrupt moderation may be based, at least in part, on the number of connections.

In one aspect there is provided a method. The method includes determining, by a host device, a number of connections between the host device and one or more link partners based, at least in part, on a connection identifier associated with each connection and determining, by the host device, a new interrupt rate based at least in part on a number of connections. The method may further include updating, by the host device, an interrupt moderation timer with a value related to the new interrupt rate, wherein the new interrupt rate corresponds to a first interrupt rate if the number of connections is below a first threshold and to a second interrupt rate if the number of connections is above a second threshold, the first interrupt rate greater than the second interrupt rate and the first threshold less than the second threshold.

In another aspect there is provided a host device. The host device includes a processor; an interrupt moderation timer configured to store an interrupt moderation timer value; a network controller configured to couple the host device to at least one link partner; and a network device driver. The network device driver is configured to determine a number of connections between the host device and one or more link partners based, at least in part, on a connection identifier associated with each connection. The network device driver is further configured to determine a new interrupt rate based at least in part on a number of connections. The network device driver is further configured to update an interrupt moderation timer with a value related to the new interrupt rate, wherein the new interrupt rate corresponds to a first interrupt rate if the number of connections is below a first threshold and to a second interrupt rate if the number of connections is above a second threshold, the first interrupt rate greater than the second interrupt rate and the first threshold less than the second threshold.

In another aspect there is provided a system. The system includes one or more storage mediums having stored thereon, individually or in combination, instructions that when executed by one or more processors, results in the following: determining a number of connections between a host device and one or more link partners based, at least in part, on a connection identifier associated with each connection; determining a new interrupt rate based at least in part on a number of connections; and updating an interrupt moderation timer with a value related to the new interrupt rate, wherein the new interrupt rate corresponds to a first interrupt rate if the number of connections is below a first threshold and to a second interrupt rate if the number of connections is above a second threshold, the first interrupt rate greater than the second interrupt rate and the first threshold less than the second threshold.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method comprising:
   determining, by a host device, a number of connections between the host device and one or more link partners based on, at least in part, a connection identifier for each connection;
   determining, by the host device, a new interrupt rate based at least in part on a number of connections;
   updating, by the host device, an interrupt moderation timer with a value related to the new interrupt rate, and;
   configuring the interrupt moderation timer to cause interrupts to occur at the new interrupt rate;
   wherein:
   said determining a new interrupt rate comprises comparing the number of connections to a first threshold number of connections and a second threshold number of connections that is greater than the first threshold number of connections;

when said number of connections is less than said first threshold, the new interrupt rate is a first interrupt rate;

when said number of connections is greater than said second threshold, the new interrupt rate is a second interrupt rate;

when said number of connections is between said first and second thresholds, the new interrupt rate is a third interrupt rate;

the first interrupt rate is greater than the second and third interrupt rates; and the third interrupt rate is greater than the second interrupt rate.

2. The method of claim 1, further comprising generating, by the host device, the connection identifier for each connection based on, at least in part, a received packet.

3. The method of claim 1, further comprising determining, by the host device, a number of packets received during an interrupt moderation interval, wherein the new interrupt rate is determined based on, at least in part, the number of packets received.

4. The method of claim 1, further comprising determining, by the host device, an average packet size of packets received during an interrupt moderation interval, the average packet size corresponding to a sum of sizes of packet payloads divided by a number of packets received, wherein the new interrupt rate is determined based on, at least in part, the average packet size.

5. The method of claim 1, wherein the connections comprise at least one of a TCP (Transmission Control Protocol) connection and a UDP (User Datagram Protocol) data stream.

6. The method of claim 1, wherein:
when the new interrupt rate is set to the third interrupt rate, the method further comprises setting the third interrupt rate based at least in part on a comparison of a number of packets to a threshold number of packets and a comparison of an average packet size to a threshold average packet size;

when the number of packets exceeds the threshold number of packets and the average packet size exceeds the threshold average packet size, the third interrupt rate is set to a first value;

when the number of packets exceeds the threshold number of packets and the average packet size is less than the threshold average packet size, the third interrupt rate is set to a second value;

when the number of packets is less than the threshold number of packets and the average packet size is less than the threshold average packet size, the third interrupt rate is set to a third value;

the first value is less than the second and third values; and
the second value is greater than the third value.

7. A host device comprising:
a processor;
an interrupt moderation timer configured to store an interrupt moderation timer value;
a network controller configured to couple the host device to at least one link partner; and
a network device driver configured to:
determine a number of connections between the host device and one or more link partners based on, at least in part, a connection identifier for each connection;
determine a new interrupt rate based at least in part by comparing a number of connections to a first threshold number of connections and a second threshold number of connections that is greater than the first threshold number of connections;
update an interrupt moderation timer with a value related to the new interrupt rate; and
configure the interrupt moderation timer to cause interrupts to occur at the new interrupt rate wherein:
when said number of connections is less than said first threshold, the new interrupt rate is a first interrupt rate;

when said number of connections is greater than said second threshold, the new interrupt rate is a second interrupt rate;

when said number of connections is between said first and second thresholds, the new interrupt rate is a third interrupt rate;

the first interrupt rate is greater than the second and third interrupt rates; and the third interrupt rate is greater than the second interrupt rate.

8. The host device of claim 7, wherein the network controller is configured to generate the connection identifier for each connection based on, at least in part, a received packet.

9. The host device of claim 8, wherein the connection identifier is generated, based at least in part, on a source identifier and a destination identifier included in a packet header of the received packet.

10. The host device of claim 8, wherein the connection identifier comprises a hash of at least a portion of a packet header included in the received packet.

11. The host device of claim 7, wherein the network device driver is further configured to determine a number of packets received during an interrupt moderation interval, wherein the new interrupt rate is determined based, at least in part, on the number of packets received.

12. The host device of claim 7, wherein the network device driver is further configured to determine an average packet size of packets received during an interrupt moderation interval, the average packet size corresponding to a sum of sizes of packet payloads divided by a number of packets received, wherein the new interrupt rate is determined based, at least in part, on the average packet size.

13. The host device of claim 7, wherein the connections comprise at least one of a TCP (Transmission Control Protocol) connection and a UDP (User Datagram Protocol) data stream.

14. The host device of claim 7, wherein:
when the new interrupt rate is set to the third interrupt rate, the method further comprises setting the third interrupt rate based at least in part on a comparison of a number of packets to a threshold number of packets and a comparison of an average packet size to a threshold average packet size;

when the number of packets exceeds the threshold number of packets and the average packet size exceeds the threshold average packet size, the third interrupt rate is set to a first value;

when the number of packets exceeds the threshold number of packets and the average packet size is less than the threshold average packet size, the third interrupt rate is set to a second value;

when the number of packets is less than the threshold number of packets and the average packet size is less than the threshold average packet size, the third interrupt rate is set to a third value;

the first value is less than the second and third values; and
the second value is greater than the third value.

15. A system comprising one or more processors and one or more non-transient computer readable storage mediums having stored thereon, individually or in combination, instructions that when executed by the one or more processors result in the following operations comprising:

determine a number of connections between a host device and one or more link partners based, at least in part, on a connection identifier for each connection;

determine a new interrupt rate based at least in part by comparing the number of connections to a first threshold number of connections and a second threshold number of connections that is greater than the first threshold number of connections;

update an interrupt moderation timer with a value related to the new interrupt rate;

configure the interrupt moderation timer to cause interrupts to occur at the new interrupt rate;

wherein:

when said number of connections is less than said first threshold, the new interrupt rate is a first interrupt rate;

when said number of connections is greater than said second threshold, the new interrupt rate is a second interrupt rate;

when said number of connections is between said first and second thresholds, the new interrupt rate is a third interrupt rate;

the first interrupt rate is greater than the second and third interrupt rates; and the third interrupt rate is greater than the second interrupt rate.

16. The system of claim 15, wherein the instructions that when executed by one or more processors results in the following additional operations comprising: generate the connection identifier for each connection based, at least in part, on a received packet.

17. The system of claim 15, wherein the instructions that when executed by one or more processors results in the following additional operations comprising: determine a number of packets received during an interrupt moderation interval, wherein the new interrupt rate is determined based, at least in part, on the number of packets received.

18. The system of claim 15, wherein the instructions that when executed by one or more processors results in the following additional operations comprising: determine an average packet size of packets received during an interrupt moderation interval, the average packet size corresponding to a sum of sizes of packet payloads divided by a number of packets received, wherein the new interrupt rate is determined based, at least in part, on the average packet size.

19. The system of claim 15, wherein the connections comprise at least one of a TCP (Transmission Control Protocol) connection and a UDP (User Datagram Protocol) data stream.

20. The system of claim 15, wherein:

when the new interrupt rate is set to the third interrupt rate, the method further comprises setting the third interrupt rate based at least in part on a comparison of a number of packets to a threshold number of packets and a comparison of an average packet size to a threshold average packet size;

when the number of packets exceeds the threshold number of packets and the average packet size exceeds the threshold average packet size, the third interrupt rate is set to a first value;

when the number of packets exceeds the threshold number of packets and the average packet size is less than the threshold average packet size, the third interrupt rate is set to a second value;

when the number of packets is less than the threshold number of packets and the average packet size is less than the threshold average packet size, the third interrupt rate is set to a third value;

the first value is less than the second and third values; and the second value is greater than the third value.

\* \* \* \* \*